(12) United States Patent
Liu et al.

(10) Patent No.: US 12,376,086 B2
(45) Date of Patent: Jul. 29, 2025

(54) METHOD AND APPARATUS FOR SHARING COMMUNICATION CHANNEL

(71) Applicant: Telefonaktiebolaget LM Ericsson (publ), Stockholm (SE)

(72) Inventors: Jinhua Liu, Beijing (CN); Min Wang, Luleå (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 531 days.

(21) Appl. No.: 17/416,166

(22) PCT Filed: Oct. 18, 2019

(86) PCT No.: PCT/CN2019/111984
§ 371 (c)(1),
(2) Date: Jun. 18, 2021

(87) PCT Pub. No.: WO2020/125180
PCT Pub. Date: Jun. 25, 2020

(65) Prior Publication Data
US 2022/0104199 A1    Mar. 31, 2022

(30) Foreign Application Priority Data

Dec. 20, 2018  (WO) ................ PCT/CN2018/122373

(51) Int. Cl.
*H04W 72/0453*  (2023.01)
*H04L 1/18*  (2023.01)
(Continued)

(52) U.S. Cl.
CPC ........... *H04W 72/0453* (2013.01); *H04L 1/18* (2013.01); *H04W 52/04* (2013.01); *H04W 72/02* (2013.01)

(58) Field of Classification Search
CPC . H04W 72/0453; H04W 52/04; H04W 72/02; H04W 48/16; H04W 72/1215; H04L 1/18
(Continued)

(56) References Cited

U.S. PATENT DOCUMENTS

| | | | |
|---|---|---|---|
| 2017/0135128 A1* | 5/2017 | Yerramalli | .......... H04W 74/006 |
| 2018/0027590 A1* | 1/2018 | Yerramalli | ............ H04W 16/14 370/328 |

(Continued)

FOREIGN PATENT DOCUMENTS

| | | |
|---|---|---|
| CN | 104486806 A | 4/2015 |
| JP | 2018191148 A | 11/2018 |

(Continued)

OTHER PUBLICATIONS

3GPP TSG WG1 #91; Qualcomm Incorporated; Channel Access for Autonomous UL Access; R1-1720406 (Year: 2017).*
(Continued)

*Primary Examiner* — Xuan Lu
(74) *Attorney, Agent, or Firm* — Weisberg, I.P. Law, P.A.

(57) ABSTRACT

Various embodiments of the present disclosure provide a method for sharing a channel. The method which may be performed in a first communication device comprises determining, according to one or more property parameters of a service, whether to enable a channel acquisition function of the first communication device for the service. The channel acquisition function allows the first communication device to acquire a channel for communications between the first communication device and a second communication device. The method further comprises performing traffic transmission for the service between the first communication device and the second communication device, based at least in part on the determination. According to some embodiments of the present disclosure, the channel acquisition during chan- (Continued)

gNB Initiated COT (not shared)

nel occupation time can be implemented adaptively and flexibly, so that the latency performance and the resource utilization can be improved.

16 Claims, 11 Drawing Sheets

(51) Int. Cl.
  *H04W 48/16* (2009.01)
  *H04W 52/04* (2009.01)
  *H04W 72/02* (2009.01)
  *H04W 72/12* (2023.01)
(58) Field of Classification Search
  USPC .......................................................... 370/329
  See application file for complete search history.

(56) References Cited

U.S. PATENT DOCUMENTS

| 2018/0152939 | A1 | 5/2018 | Lee et al. | |
| 2019/0200386 | A1* | 6/2019 | Yang | H04W 74/0808 |
| 2020/0329493 | A1* | 10/2020 | Yang | H04W 72/23 |

FOREIGN PATENT DOCUMENTS

| WO | WO-2016072917 A3 * | 6/2016 | ........ H04W 72/0446 |
| WO | 2017050282 A1 | 3/2017 | |
| WO | WO-2020125180 A1 * | 6/2020 | ............... H04L 1/18 |

OTHER PUBLICATIONS

Qualcomm Incorporated, "R1-1720406: Channel Access for Autonomous UL Access," 3GPP TSG RAN WG1 #91, Nov. 27-Dec. 1, 2017, Reno, Nevada, 4 pages.
Extended European Search Report for European Patent Application No. 19899611.8, mailed Jun. 30, 2022, 10 pages.
Interdigital, Inc., "R1-1804680: BWP operation in unlicensed spectrum," 3GPP RAN WG1 Meeting #92bis, Apr. 16-20, 2018, Sanya, China, 4 pages.
Interdigital, Inc., "R1-1806968: BWP operation in unlicensed spectrum," 3GPP RAN WG1 Meeting #93, May 21-25, 2018, Busan, Korea, 4 pages.
Interdigital, Inc., "R2-1811452: DRX in NR-U," 3GPP TSG-RAN WG2 Meeting #103, Aug. 20-24, 2018, Gothenburg, Sweden, 3 pages.
International Search Report and Written Opinion for International Patent Application No. PCT/CN2019/111984, mailed Jan. 16, 2020, 9 pages.
Author Unknown, "Technical Specification Group Radio Access Network; NR; Radio Resource Control (RRC) protocol specification (Release 15)," Technical Specification 38.331, Version 15.3.0, Sep. 2018, 3GPP Organizational Partners, 445 pages.
Office Action for Taiwanese Patent Application No. 108143933, mailed Oct. 12, 2020, 18 pages.
Interdigital, Inc., "R1-1813220: Channel access procedure and coexistence in NR-U," 3GPP TSG RAN WG1 Meeting #95, Nov. 12-16, 2018, Spokane, Washington, 7 pages.
Examination Report for European Patent Application No. 19899611.8, mailed Nov. 29, 2023, 7 pages.

* cited by examiner

METHOD AND APPARATUS FOR SHARING COMMUNICATION CHANNEL

This application is a 35 U.S.C. § 371 national phase filing of International Application No. PCT/CN2019/111984, filed Oct. 18, 2019, which claims the benefit of International Application No. PCT/CN2018/122373, filed Dec. 20, 2018, the disclosures of which are incorporated herein by reference in their entireties.

FIELD OF THE INVENTION

The present disclosure generally relates to communication networks, and more specifically, to channel sharing in a communication network.

BACKGROUND

This section introduces aspects that may facilitate a better understanding of the disclosure. Accordingly, the statements of this section are to be read in this light and are not to be understood as admissions about what is in the prior art or what is not in the prior art.

Communication service providers and network operators have been continually facing challenges to deliver value and convenience to consumers by, for example, providing compelling network services and performance. With the rapid development of networking and communication technologies, wireless communication networks such as long-term evolution (LTE) and new radio (NR) networks are expected to achieve high traffic capacity and end-user data rate. Besides the traditional licensed exclusive spectrum, the wireless communication networks are also expected to be operable on the unlicensed spectrum. Listen-before-talk (LBT) may need to be performed by a communication device before transmitting on a channel that uses the unlicensed spectrum. In this case, the communication device is required to make a clear channel assessment (CCA) to determine if the channel is available. Application of a CCA check may introduce extra transmission latency and affect utilization of radio resources. Thus, it is desirable to improve communication channel sharing efficiently.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

According to the LBT mechanism, after sensing a channel available, a communication device is typically allowed to transmit for a certain amount of time, sometimes referred to as transmission opportunity (TXOP). The length of the TXOP depends on regulation and type of CCA that has been performed, which usually ranges from 1 ms to 10 ms. This duration is often referred to as channel occupation time (COT). Please note that other terms than COT may also be used to refer to this duration. In order to reduce the latency due to LBT operations, a wireless communication network such as NR or 5G is proposed to support COT sharing between uplink (UL) and downlink (DL) bursts within COT duration. However, sharing of COT between UL and DL bursts without performing an LBT operation, means that a gap from the end of a data burst to the beginning of the next data burst needs to be equal or shorter than 16 µs. This gap may be tight so that some terminal devices may not be able to fulfill it. In this case, the benefits of COT sharing would be minimized. On the other hand, additional signaling or data transfer for channel acquisition during the COT may waste system resources and negatively impact the network coexistence. Therefore, it may be desirable to configure COT sharing in a more efficient way.

Various embodiments of the present disclosure propose a solution of COT sharing in a communication network, which can enable a communication device to configure a channel acquisition function per service, so that the communication device can perform traffic transmissions with lower latency and higher flexibility.

According to a first aspect of the present disclosure, there is provided a method performed by a first communication device. The method comprises determining, according to one or more property parameters of a service, whether to enable a channel acquisition function of the first communication device for the service. The channel acquisition function allows the first communication device to acquire a channel for communications between the first communication device and a second communication device. The method further comprises performing traffic transmission for the service between the first communication device and the second communication device, based at least in part on the determination.

In accordance with an exemplary embodiment, the determination of whether to enable the channel acquisition function of the first communication device for the service may be made by the first communication device based at least in part on configuration information about the channel acquisition function.

In accordance with an exemplary embodiment, said performing the traffic transmission for the service between the first communication device and the second communication device may comprise: allowing the first communication device to acquire the channel for communications between the first communication device and the second communication device, in response to the determination of enabling the channel acquisition function of the first communication device for the service; and allowing the first communication device to transmit channel acquisition signaling in the channel acquired by the first communication device.

In accordance with an exemplary embodiment, said performing the traffic transmission for the service between the first communication device and the second communication device may further comprise: transmitting the channel acquisition signaling in the channel acquired by the first communication device.

In accordance with an exemplary embodiment, the method according to the first aspect of the present disclosure may further comprise: applying a diversity technique for the transmission of the channel acquisition signaling.

In accordance with an exemplary embodiment, the method according to the first aspect of the present disclosure may further comprise: performing power control for the transmission of the channel acquisition signaling.

In accordance with an exemplary embodiment, said performing the traffic transmission for the service between the first communication device and the second communication device may further comprise: transmitting other channel acquisition signaling to the second communication device in the channel acquired by the first communication device, based at least in part on gap duration between reception of traffics from the second communication device and transmission of traffics to the second communication device.

In accordance with an exemplary embodiment, the method according to the first aspect of the present disclosure may further comprise: receiving from the second communication device a notification that the second communication device transmits channel acquisition signaling to assist the first communication device in acquiring the channel.

In accordance with an exemplary embodiment, the method according to the first aspect of the present disclosure may further comprise: using the channel acquired for the first communication device by the second communication device, without transmitting channel acquisition signaling.

According to a second aspect of the present disclosure, there is provided an apparatus which may be implemented as a first communication device. The apparatus may comprise one or more processors and one or more memories comprising computer program codes. The one or more memories and the computer program codes may be configured to, with the one or more processors, cause the apparatus at least to perform any step of the method according to the first aspect of the present disclosure.

According to a third aspect of the present disclosure, there is provided a computer-readable medium having computer program codes embodied thereon which, when executed on a computer, cause the computer to perform any step of the method according to the first aspect of the present disclosure.

According to a fourth aspect of the present disclosure, there is provided an apparatus such as a first communication device. The apparatus may comprise a determining unit and a performing unit. In accordance with some exemplary embodiments, the determining unit may be operable to carry out at least the determining step of the method according to the first aspect of the present disclosure. The performing unit may be operable to carry out at least the performing step of the method according to the first aspect of the present disclosure.

According to a fifth aspect of the present disclosure, there is provided a method performed by a second communication device. The method comprises performing traffic transmission in a channel for communications between a first communication device and the second communication device. The method further comprises receiving traffic transmission for a service in the channel from the first communication device. The channel is acquired by the first communication device which enables a channel acquisition function for the service according to one or more property parameters of the service.

In accordance with an exemplary embodiment, the enablement of the channel acquisition function for the service may be based at least in part on configuration information about the channel acquisition function.

In accordance with an exemplary embodiment, said performing the traffic transmission in the channel for communications between the first communication device and the second communication device may comprise: transmitting the configuration information to the first communication device.

In accordance with an exemplary embodiment, said receiving the traffic transmission for the service in the channel from the first communication device may comprise: receiving channel acquisition signaling from the first communication device to indicate that the channel is acquired by the first communication device.

In accordance with an exemplary embodiment, the method according to the fifth aspect of the present disclosure may further comprise: applying a diversity technique for the reception of the channel acquisition signaling.

In accordance with an exemplary embodiment, the method according to the fifth aspect of the present disclosure may further comprise: receiving other channel acquisition signaling in the channel acquired by the first communication device.

In accordance with an exemplary embodiment, the method according to the fifth aspect of the present disclosure may further comprise: transmitting channel acquisition signaling to assist the first communication device in acquiring the channel; and indicating the first communication device not to transmit channel acquisition signaling in the channel which is acquired for the first communication device by the second communication device.

According to a sixth aspect of the present disclosure, there is provided an apparatus which may be implemented as a second communication device. The apparatus may comprise one or more processors and one or more memories comprising computer program codes. The one or more memories and the computer program codes may be configured to, with the one or more processors, cause the apparatus at least to perform any step of the method according to the fifth aspect of the present disclosure.

According to a seventh aspect of the present disclosure, there is provided a computer-readable medium having computer program codes embodied thereon which, when executed on a computer, cause the computer to perform any step of the method according to the fifth aspect of the present disclosure.

According to an eighth aspect of the present disclosure, there is provided an apparatus such as a second communication device. The apparatus may comprise a performing unit and a receiving unit. In accordance with some exemplary embodiments, the performing unit may be operable to carry out at least the performing step of the method according to the fifth aspect of the present disclosure. The receiving unit may be operable to carry out at least the receiving step of the method according to the fifth aspect of the present disclosure.

In accordance with an exemplary embodiment, the one or more property parameters of the service may comprise at least one of: a latency requirement of the service; a quality of service related indicator specific to the service; a priority level of the service; and a purpose of the service.

In accordance with an exemplary embodiment, the configuration information about the channel acquisition function may indicate the first communication device to enable the channel acquisition function for a service with a priority level higher than a predefined level.

In accordance with an exemplary embodiment, the first communication device may comprise a terminal device and the second communication device may comprise a network node. In this case, the configuration information about the channel acquisition function may be received by the first communication device from the second communication device.

In accordance with an exemplary embodiment, the configuration information about the channel acquisition function may be indicated by at least one of: an indicator in downlink control information to indicate enablement or disablement of the channel acquisition function; a predefined network identifier for downlink control information; a predefined resource set search space for downlink control information; one or more logical channel prioritization mapping restrictions; and one or more parameters of a logical channel prioritization mapping restriction.

In accordance with an exemplary embodiment, the first communication device may comprise a network node and the second communication device may comprise a terminal device. In this case, the configuration information may be provisioned by the first communication device.

In accordance with an exemplary embodiment, the first communication device may be allowed to acquire the channel for up to a predefined number of times, during occupation time of the channel sharable by the first communication device and the second communication device.

In accordance with an exemplary embodiment, the channel acquisition function may be configured per radio resource unit allocated to the first communication device. The radio resource unit may comprise at least one of a bandwidth part, a channel, a serving cell and a carrier.

In accordance with an exemplary embodiment, for the first communication device, gap duration between reception of traffics from the second communication device and transmission of traffics to the second communication device may be smaller than a predefined threshold.

In accordance with an exemplary embodiment, the channel acquisition signaling may be pre-prepared and encoded in at least one of: a packet data unit, control signaling, random access signaling, a reference signal, and a paging message.

In accordance with an exemplary embodiment, for the packet data unit carrying the channel acquisition signaling, an automatic repeat request process may be applied based at least in part on another automatic repeat request process of subsequent transmission from the first communication device to the second communication device.

In accordance with an exemplary embodiment, the channel acquisition signaling may comprise one or more message items comprising at least one of: a measurement report of signal quality; a power headroom report; a buffer status report; an interference report; a channel state information report; a candidate beam list; a measurement report of neighboring cells; a measurement report of transmission points; and a control element predefined for the channel acquisition signaling.

In accordance with an exemplary embodiment, the one or more message items may be packed as a control element for medium access control.

In accordance with an exemplary embodiment, the one or more message items may be included in a packet data unit according to a predefined order of priority levels of the one or more message items.

In accordance with an exemplary embodiment, the channel acquisition signaling may comprise a copy of information content carried in subsequent transmission from the first communication device to the second communication device.

In accordance with an exemplary embodiment, the first communication device may be assigned with radio resources specified for the transmission of the channel acquisition signaling.

According to a ninth aspect of the present disclosure, there is provided a method implemented in a communication system which may include a host computer, a base station and a UE. The method may comprise providing user data at the host computer. Optionally, the method may comprise, at the host computer, initiating a transmission carrying the user data to the UE via a cellular network comprising the base station which may perform any step of the method according to any of the first and the fifth aspects of the present disclosure.

According to a tenth aspect of the present disclosure, there is provided a communication system including a host computer. The host computer may comprise processing circuitry configured to provide user data, and a communication interface configured to forward the user data to a cellular network for transmission to a UE. The cellular network may comprise a base station having a radio interface and processing circuitry. The base station's processing circuitry may be configured to perform any step of the method according to any of the first and the fifth aspects of the present disclosure.

According to an eleventh aspect of the present disclosure, there is provided a method implemented in a communication system which may include a host computer, a base station and a UE. The method may comprise providing user data at the host computer. Optionally, the method may comprise, at the host computer, initiating a transmission carrying the user data to the UE via a cellular network comprising the base station. The UE may perform any step of the method according to any of the first and the fifth aspects of the present disclosure.

According to a twelfth aspect of the present disclosure, there is provided a communication system including a host computer. The host computer may comprise processing circuitry configured to provide user data, and a communication interface configured to forward user data to a cellular network for transmission to a UE. The UE may comprise a radio interface and processing circuitry. The UE's processing circuitry may be configured to perform any step of the method according to any of the first and the fifth aspects of the present disclosure.

According to a thirteenth aspect of the present disclosure, there is provided a method implemented in a communication system which may include a host computer, a base station and a UE. The method may comprise, at the host computer, receiving user data transmitted to the base station from the UE which may perform any step of the method according to any of the first and the fifth aspects of the present disclosure.

According to a fourteenth aspect of the present disclosure, there is provided a communication system including a host computer. The host computer may comprise a communication interface configured to receive user data originating from a transmission from a UE to a base station. The UE may comprise a radio interface and processing circuitry. The UE's processing circuitry may be configured to perform any step of the method according to any of the first and the fifth aspects of the present disclosure.

According to a fifteenth aspect of the present disclosure, there is provided a method implemented in a communication system which may include a host computer, a base station and a UE. The method may comprise, at the host computer, receiving, from the base station, user data originating from a transmission which the base station has received from the UE. The base station may perform any step of the method according to any of the first and the fifth aspects of the present disclosure.

According to a sixteenth aspect of the present disclosure, there is provided a communication system which may include a host computer. The host computer may comprise a communication interface configured to receive user data originating from a transmission from a UE to a base station. The base station may comprise a radio interface and processing circuitry. The base station's processing circuitry may be configured to perform any step of the method according to any of the first and the fifth aspects of the present disclosure.

BRIEF DESCRIPTION OF THE DRAWINGS

The disclosure itself, the preferable mode of use and further objectives are best understood by reference to the following detailed description of the embodiments when read in conjunction with the accompanying drawings, in which.

DETAILED DESCRIPTION

Figure 1A:
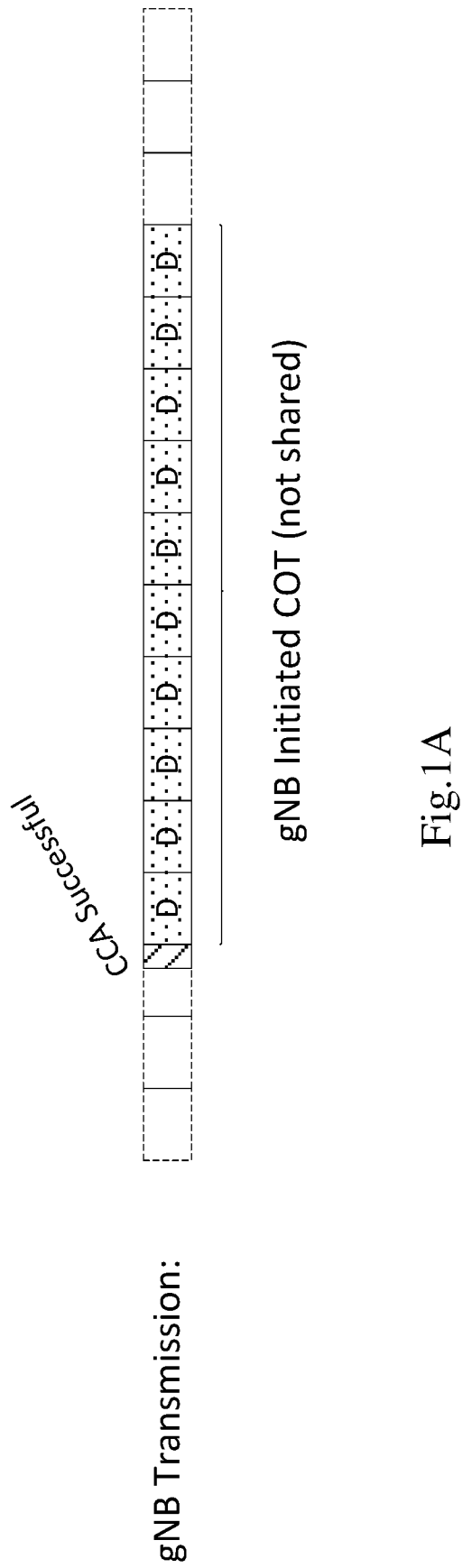
FIGS. 1A-1B are diagrams illustrating examples of TXOP according to some embodiments of the present disclosure.

The embodiments of the present disclosure are described in detail with reference to the accompanying drawings. It should be understood that these embodiments are discussed only for the purpose of enabling those skilled persons in the art to better understand and thus implement the present disclosure, rather than suggesting any limitations on the scope of the present disclosure. Reference throughout this specification to features, advantages, or similar language does not imply that all of the features and advantages that may be realized with the present disclosure should be or are in any single embodiment of the disclosure. Rather, language referring to the features and advantages is understood to mean that a specific feature, advantage, or characteristic described in connection with an embodiment is included in at least one embodiment of the present disclosure. Furthermore, the described features, advantages, and characteristics of the disclosure may be combined in any suitable manner in one or more embodiments. One skilled in the relevant art will recognize that the disclosure may be practiced without one or more of the specific features or advantages of a particular embodiment. In other instances, additional features and advantages may be recognized in certain embodiments that may not be present in all embodiments of the disclosure.

As used herein, the term "communication network" refers to a network following any suitable communication standards, such as new radio (NR), long term evolution (LTE), LTE-Advanced, wideband code division multiple access (WCDMA), high-speed packet access (HSPA), and so on. Furthermore, the communications between a terminal device and a network node in the communication network may be performed according to any suitable generation communication protocols, including, but not limited to, the first generation (1G), the second generation (2G), 2.5G, 2.75G, the third generation (3G), 4G, 4.5G, 5G communication protocols, and/or any other protocols either currently known or to be developed in the future.

The term "network node" refers to a network device in a communication network via which a terminal device accesses to the network and receives services therefrom. The network node may refer to a base station (BS), an access point (AP), a multi-cell/multicast coordination entity (MCE), a controller, a station (STA) or any other suitable device in a wireless communication network. The BS may be, for example, a node B (NodeB or NB), an evolved NodeB (eNodeB or eNB), a next generation NodeB (gNodeB or gNB), a remote radio unit (RRU), a radio header (RH), a remote radio head (RRH), a relay, a low power node such as a femto, a pico, and so forth.

Yet further examples of the network node comprise multi-standard radio (MSR) radio equipment such as MSR BSs, network controllers such as radio network controllers (RNCs) or base station controllers (BSCs), base transceiver stations (BTSs), transmission points, transmission nodes, positioning nodes and/or the like. More generally, however, the network node may represent any suitable device (or group of devices) capable, configured, arranged, and/or operable to enable and/or provide a terminal device access to a wireless communication network or to provide some service to a terminal device that has accessed to the wireless communication network.

The term "terminal device" refers to any end device that can access a communication network and receive services therefrom. By way of example and not limitation, the terminal device may refer to a mobile terminal, a user equipment (UE), or other suitable devices. The UE may be, for example, a subscriber station, a portable subscriber station, a mobile station (MS) or an access terminal (AT). The terminal device may include, but not limited to, portable computers, image capture terminal devices such as digital cameras, gaming terminal devices, music storage and playback appliances, a mobile phone, a cellular phone, a smart phone, a tablet, a wearable device, a personal digital assistant (PDA), a vehicle, and the like.

As yet another specific example, in an Internet of things (IoT) scenario, a terminal device may also be called an IoT device and represent a machine or other device that performs monitoring, sensing and/or measurements etc., and transmits the results of such monitoring, sensing and/or measurements etc. to another terminal device and/or a network equipment. The terminal device may in this case be a machine-to-machine (M2M) device, which may in a 3rd generation partnership project (3GPP) context be referred to as a machine-type communication (MTC) device.

As one particular example, the terminal device may be a UE implementing the 3GPP narrow band Internet of things (NB-IoT) standard. Particular examples of such machines or devices are sensors, metering devices such as power meters, industrial machinery, or home or personal appliances, e.g. refrigerators, televisions, personal wearables such as watches etc. In other scenarios, a terminal device may represent a vehicle or other equipment, for example, a medical instrument that is capable of monitoring, sensing and/or reporting etc. on its operational status or other functions associated with its operation.

As used herein, the terms "first", "second" and so forth refer to different elements. The singular forms "a" and "an" are intended to include the plural forms as well, unless the context clearly indicates otherwise. The terms "comprises", "comprising", "has", "having", "includes" and/or "including" as used herein, specify the presence of stated features, elements, and/or components and the like, but do not preclude the presence or addition of one or more other features, elements, components and/or combinations thereof. The term "based on" is to be read as "based at least in part on". The term "one embodiment" and "an embodiment" are to be read as "at least one embodiment". The term "another embodiment" is to be read as "at least one other embodiment". Other definitions, explicit and implicit, may be included below.

Wireless communication networks are widely deployed to provide various telecommunication services such as voice, video, data, messaging and broadcasts. In order to tackle with the ever-increasing data demanding, one interesting option for communication technique development is to allow a wireless communication network such as a NR or 5G to be operable on the unlicensed bands, besides the licensed bands. For example, both license assisted access (LAA) and standalone unlicensed operations may be supported in the wireless communication network. Compared to the LTE LAA, NR in unlicensed bands (NR-U) also needs to support dual cell (DC) and standalone scenarios, where the media access control (MAC) procedures including random access channel (RACH) and scheduling procedure on unlicensed spectrum are subject to the LBT failures, while there is no such restriction in LTE LAA, since there is licensed spectrum in LAA scenario so the RACH and scheduling related signaling can be transmitted on the licensed spectrum instead of unlicensed spectrum.

Listen-before-talk (LBT) is designed for unlicensed spectrum coexistence with other radio access technologies (RATs) such as Wi-Fi. For a node (e.g., NR-U gNB/UE, LTE-LAA eNB/UE, or Wi-Fi AP/STA)) to be allowed to transmit in the unlicensed spectrum (e.g., 5 GHz band), it typically needs to perform a clear channel assessment (CCA) before any transmission. This procedure typically includes sensing the medium to be idle for a number of time intervals. Sensing the medium to be idle can be done in different ways, e.g. using energy detection (ED), preamble detection, or virtual carrier sensing. For instance, a transmitter may involve ED over a time period compared to an ED threshold in order to determine whether a channel is idle. In the case that the channel is determined to be occupied, the transmitter performs a random back-off within a contention window before next CCA attempt. In order to protect the acknowledgement (ACK) transmissions, the transmitter needs to defer a period after each busy CCA slot prior to resuming back-off. In the case that the transmitter has grasped access to a channel, the transmitter is only allowed to perform transmission up to the maximum time duration (which is also referred to as the maximum channel occupancy time (MCOT)).

In accordance with an exemplary embodiment, the configurable LBT schemes comprise, as a non-limiting example, at least one of the below LBT categories:
  Category 1: No LBT;
  Category 2: LBT without random back-off;
  Category 3: LBT with random back-off with fixed size of contention window; and
  Category 4: LBT with random back-off with variable size of contention window.

Specifically for Category 4 LBT, in order to provide differentiation to channel access priorities based on the type of traffic being served (e.g. voice over IP (VoIP), video, best effort, or background), four LBT priority classes are defined with different contention window sizes (CWS) and MCOT. Table 1 summarizes the MCOT and CWS for the DL channel access priority classes, while Table 2 summarizes the MCOT and CWS for the UL channel access priority classes. The channel access priority based on the service type may be applicable for quality of service (QoS) differentiation between services.

TABLE 1

Channel Access Priority Class for DL

| Channel Access Priority Class | MCOT | Allowed CWS |
| --- | --- | --- |
| 1 | 2 ms | {3, 7} |
| 2 | 3 ms | {7, 15} |
| 3 | 8 or 10 ms | {15, 31, 63} |
| 4 | 8 or 10 ms | {15, 31, 63, 127, 255, 511, 1023} |

TABLE 2

Channel Access Priority Class for UL

| Channel Access Priority Class | MCOT | Allowed CWS |
| --- | --- | --- |
| 1 | 2 ms | {3, 7} |
| 2 | 4 ms | {7, 15} |
| 3 | 6 ms or 10 ms | {15, 31, 63, 127, 255, 511, 1023} |
| 4 | 6 ms or 10 ms | {15, 31, 63, 127, 255, 511, 1023} |

In a network scenario such as Wi-Fi, a feedback of data reception acknowledgements (ACKs) is transmitted without performing CCA. Preceding feedback transmission, a small time duration called short inter-frame space (SIFS) is introduced between the data transmission and the corresponding feedback which does not include actual sensing of the channel. As an example, the SIFS period (e.g., 16 µs for 5 GHz orthogonal frequency division multiplexing (OFDM) physical layers (PHYs)) may be defined as:

$$aSIFSTime = aRxPHYDelay + aMACProcessingDelay + aRxTxTurnaroundTime$$

where aRxPHYDelay defines the duration needed by the PHY layer to deliver a packet to the MAC layer, aMACProcessingDelay defines the duration that the MAC layer needs to trigger the PHY layer transmitting a response, and aRxTxTurnaroundTime defines the duration needed to turn the radio from reception mode into transmit mode. It can be seen that the SIFS duration/period is used to accommodate for the hardware delay to switch the direction from reception to transmission.

It is anticipated that a similar gap to accommodate for the radio turnaround time can be allowed in NR-U. For example, this can enable the transmission of physical uplink control channel (PUCCH) carrying uplink control information (UCI) feedback as well as physical uplink shared channel (PUSCH) carrying data and possible UCI within the same TXOP acquired by the initiating gNB, without the UE performing CCA before PUSCH/PUCCH transmission as long as the gap between DL and UL transmissions is less than or equal to 16 µs. Operation in this manner may be called "COT sharing".

Figure 1B:
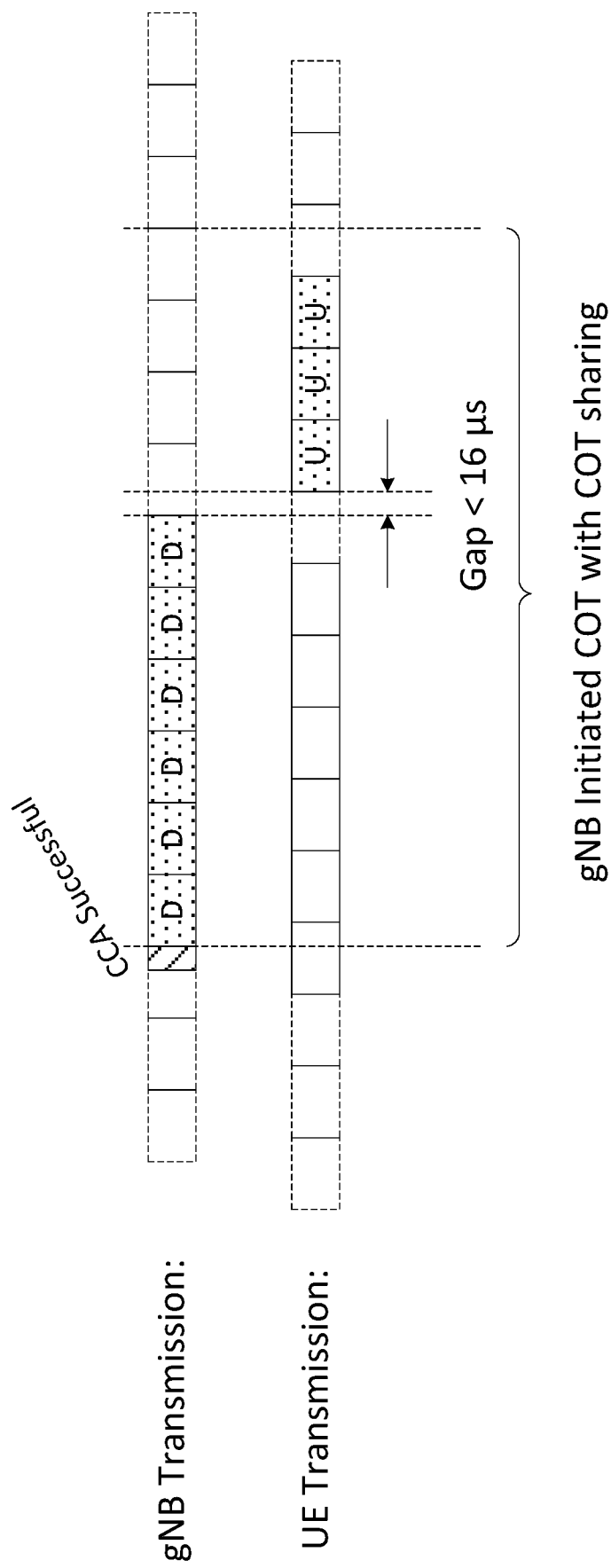

FIGS. 1A-1B are diagrams illustrating examples of TXOP according to some embodiments of the present disclosure. For the examples shown in FIGS. 1A-1B, CCA is performed by a gNB which initiates COT. In FIG. 1A, the gNB performs transmission during a TXOP without COT sharing, after CCA is successful at the gNB. In FIG. 1B, the gNB performs transmission during a TXOP with the COT being shared by a UE, after CCA is successful at the gNB. For the case of COT sharing, the gap between DL and UL transmission is less than 16 µs. It can be appreciated that the COT initiated by a UE being shared with a gNB also may be applicable in some exemplary embodiments.

Next generation systems such as NR-U are expected to support a wide range of use cases with varying requirements ranging from fully mobile devices to stationary IoT or fixed wireless broadband devices. The traffic pattern associated with many use cases is expected to consist of short or long bursts of data traffic with varying length of waiting period in between. For example, a UL burst is defined as a set of transmissions from a given UE having no gaps or gaps of no more than 16 µs. Transmissions from a UE having a gap of more than 16 µs are considered as separate UL bursts. Similarly, a DL burst is defined as a set of transmissions from a given gNB having no gaps or gaps of no more than 16 µs. Transmissions from a gNB having a gap of more than 16 µs are considered as separate DL bursts.

In accordance with an exemplary embodiment, within the gNB-initiated COT, a UL burst for a UE consisting of one or more of PUSCH, PUCCH, physical random access channel (PRACH) and sounding reference signal (SRS) may follow the LBT rules as defined in Table 3.

TABLE 3

| LBT categories applicable for a UL burst | |
|---|---|
| Cat 1 Immediate transmission | Cat 2 LBT |
| When the gap from the end of the DL transmission to the beginning of the UL burst is not more than 16 µs. | For any of the following cases: When the gap between any two successive scheduled/granted transmissions in the COT is not greater than 25 µs. For the case where a UL transmission in the gNB initiated COT is not followed by a DL transmission in the same COT. Note: the duration from the start of the first transmission within the channel occupancy until the end of the last transmission in the same channel occupancy is not exceed 20 ms. |

At least for the case where a DL burst follows a UL burst within the gNB-initiated COT and there is no gap larger than 25 µs between any two transmissions in the COT, the LBT rules as defined in Table 4 may be applied for the DL burst following a UL burst.

TABLE 4

| LBT categories applicable for a DL burst | |
|---|---|
| Cat 1 Immediate transmission | Cat 2 LBT |
| When the gap from the end of the scheduled UL transmission to | When the gap from the end of the scheduled UL transmission to the |

TABLE 4-continued

| LBT categories applicable for a DL burst | |
|---|---|
| Cat 1 Immediate transmission | Cat 2 LBT |
| the beginning of the DL burst is up to 16 µs. | beginning of the DL burst is larger than 16 µs but not more than 25 µs. |

In the case that NR-U can support COT sharing between UL and DL bursts within a gNB initiated COT duration, the latency due to LBT operations may be reduced, which is especially useful for delay sensitive services. However, the benefits of COT sharing may rely on the length of a gap from the end of a data burst to the beginning of the next data burst. In order to share COT between UL and DL bursts without an LBT operation, the gap needs to be equal or shorter than 16 µs.

In NR licensed, the time duration between the time when a UE receives an UL grant and the time when the UE starts to transmit the data corresponding to the grant is indicated by the parameter "K2", which can be configured by radio resource control (RRC). K2 (which is corresponding to PUSCH preparation time) may depend on the parameter j and an additional offset value, where the parameter j corresponds to the subcarrier spacing for Msg3 PUSCH. According to an exemplary embodiment, the maximum value of K2 can be up to 6 slots.

Given the value range of K2, in a cell, a UE with the setting of K2 less than 16 µs may be able to share COT without performing any LBT operation between UL and DL within the gNB initiated COT, while a UE with the setting of K2 larger than 16 µs, at least Category 2 LBT may be operated between the switch from a DL burst to a UL burst.

It is beneficial to be able to support transmissions (e.g., for channel state information (CSI) reporting, SRS, other PUSCH, channel state information-reference signal (CSI-RS), or other physical downlink shared channel (PDSCH)) in the time between a DL data transmission for a UE and the corresponding UL transmission of DL hybrid automatic repeat request (HARQ) feedback for the same UE within the shared COT. Potential enhancements for such type of operation, e.g. by possibly pre-configured or pre-determined UL transmissions for reducing signaling overhead for these transmissions, may also be beneficial.

In order to apply Category 1 LBT (i.e., immediate transmission) prior to the data transmission, the switch gap between a DL/UL burst and a UL/DL burst can be filled so that the gap is shorter than 16 µs. In accordance with some exemplary embodiments, a signaling/data transmission can be performed as a channel acquisition signaling/indicator to seize a channel within a switch gap, if the gap is above the threshold such as 16 µs or 25 µs. It is beneficial to adopt such enhancement option since the transmission latency due to LBT operations can be avoided. Therefore, it is desired especially for latency critical services. Additionally, the multiplexing gain of data transfer can be improved by skipping the LBT operation within the shared COT.

However, on the other hand, the additional signaling/transmission during the gap may break the regulatory rules, so that the coexistence with other RATs such as Wi-Fi may be negatively impacted by such additional channel acquisition signaling. Further, the additional signaling or data transfer for channel acquisition may waste system resources, since the additional signaling may not always carry other useful information except the channel acquisition. Therefore, it is desirable for a network to be able to define/ configure the functionality in a flexible fashion, so that the tradeoff between latency reduction of specific services and potential negative impacts on the system resource utilization and the coexistence can be well maintained.

In order to enhance the utilization of radio resources and improve the latency performance of network services, the present disclosure according to some exemplary embodiments proposes to enable a function on the signaling of channel acquisition indicator and COT sharing to be configured per service, so that the COT sharing may be applicable to a configured service which for example has critical latency requirements or higher priority. According to the proposed solution, a UE can conduct the transmission of service specific channel occupation/acquisition indicators in form of preceding transmission of the scheduled PUSCH transmissions within the DL and UL switch gap in the UE side. The preceding transmission for channel acquisition signaling can be configured by a gNB serving this UE. It can be appreciated that the proposed COT sharing and the configuration on the channel acquisition signaling may be applicable to transmissions within the gNB initiated COT and also the UE initiated COT.

It is noted that some embodiments of the present disclosure are mainly described in relation to LTE or NR specifications being used as non-limiting examples for certain exemplary network configurations and system deployments. As such, the description of exemplary embodiments given herein specifically refers to terminology which is directly related thereto. Such terminology is only used in the context of the presented non-limiting examples and embodiments, and does naturally not limit the present disclosure in any way. Rather, any other system configuration or radio technologies may equally be utilized as long as exemplary embodiments described herein are applicable.

Although some embodiments of the present disclosure are described in the context of NR-U, the proposed solution may be applicable to other unlicensed operation scenarios or sharable spectrum operation scenarios, such as LTE LAA, enhanced LAA (eLAA), further enhanced LAA (feLAA), etc. It can be realized that the same channel access priority class or different channel access priority classes may be applied for LBT operations.

Figure 2:
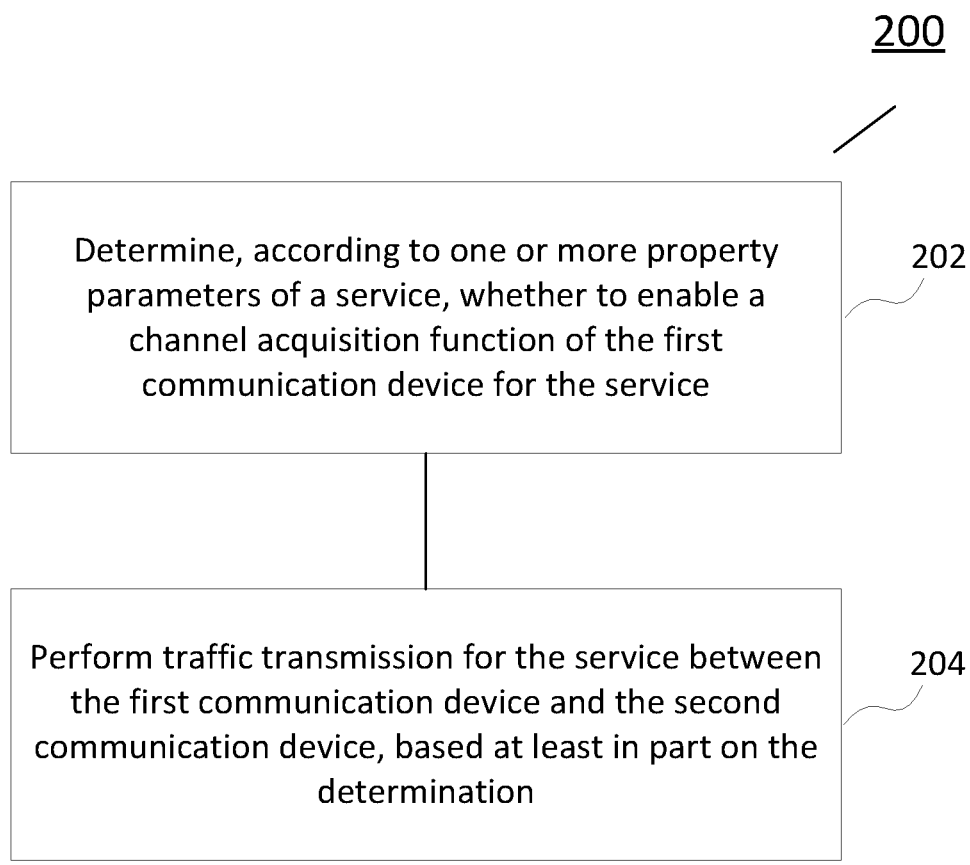
FIG. 2 is a flowchart illustrating a method according to some embodiments of the present disclosure.

FIG. 2 is a flowchart illustrating a method 200 according to some embodiments of the present disclosure. The method 200 illustrated in FIG. 2 may be performed by a first communication device or an apparatus communicatively coupled to the first communication device. In accordance with an exemplary embodiment, the first communication device may be able to enable a channel acquisition function to share COT initiated by a second communication device. In accordance with some exemplary embodiments, the first communication device may comprise a terminal device such as a UE, and correspondingly the second communication device may comprise a network node such as a gNB serving the UE. Alternatively, the first communication device may comprise a network node such as a gNB, and correspondingly the second communication device may comprise a terminal device such as a UE served by the gNB.

According to the exemplary method 200 illustrated in FIG. 2, the first communication device can determine, according to one or more property parameters of a service, whether to enable a channel acquisition function of the first communication device for the service, as shown in block 202. In accordance with some exemplary embodiments, the channel acquisition function may allow the first communication device to acquire a channel for communications between the first communication device and a second communication device. For example, the channel acquisition function may allow the first communication device to acquire a channel for which the corresponding COT sharable by the first and second communication devices is initiated by the second communication device.

In accordance with some exemplary embodiments, the one or more property parameters of the service may comprise, but not limited to, a latency requirement of the service, a quality of service related indicator (e.g., QoS class identifier/5G QoS indicator/frame quality indicators (QCI/5QI/FQIs), etc.) specific to the service, a priority level of the service, a purpose of the service, or any combination thereof. The enablement or disablement of the channel acquisition function of the first communication device for the service may be at least partly dependent on the one or more property parameters of the service. Correspondingly, the function on the signaling of a channel acquisition indicator and COT sharing can be configured per service, so that operations and settings related to the channel acquisition function may be applicable to a configured service which for example has critical QoS requirements. In this way, the configuration of the channel acquisition function of a UE may be provided per logical channel/logical channel group (LCH/LCG) or even per flow by a serving gNB.

According to an exemplary embodiment, the channel acquisition function of a UE may be configured or enabled for PRACH and PUCCH signaling depending on the purpose or priority that the signaling is intended. For example, for a PRACH transmission or PUCCH transmission triggered by a service with high priority, the channel acquisition function can be enabled for the UE. For a PRACH transmission/PUCCH transmission for specific purpose such as random access (RA) for handover or beam failure recovery (BFR) or PUCCH-scheduling request (PUCCH-SR)/PUCCH-uplink control information (PUCCH-UCI) for services with critical QoS requirement and/or higher priority, the channel acquisition function can be enabled, while for other RA events or PUCCH transmissions, the channel acquisition function may be disabled.

In accordance with some exemplary embodiments, the determination of whether to enable the channel acquisition function of the first communication device for the service can be made by the first communication device based at least in part on configuration information about the channel acquisition function. According to an exemplary embodiment, the configuration information may indicate the first communication device to enable the channel acquisition function for a service with a priority level higher than a predefined level.

In the case that the first communication device comprises a network node and the second communication device comprises a terminal device, the configuration information may be provisioned by the first communication device. For example, the configuration information may be predefined or dynamically generated by the first communication device such as a gNB.

Alternatively, in the case that the first communication device comprises a terminal device and the second communication device comprises a network node, the configuration information may be received by the first communication device from the second communication device. According to some exemplary embodiments, the configuration information may be indicated by at least one of: an indicator in downlink control information (DCI) to indicate enablement or disablement of the channel acquisition function, a predefined network identifier for DCI, a predefined resource set search space for DCI, one or more logical channel prioritization (LCP) mapping restrictions, and one or more parameters of an LCP mapping restriction.

According to an exemplary embodiment, a gNB can configure whether a UE to transmit the channel acquisition signaling using PDCCH, implicitly or explicitly. For instance, the gNB can introduce a special indicator in the PDCCH. The UE reads the indicator to determine whether to transmit the channel acquisition signaling or not. Alternatively or additionally, the gNB can introduce a special radio network temporary identity (RNTI) or a specific control resource set (CORESET)/PDCCH search space, so that in the case of a PDCCH addressed to the special RNTI/CORESET/PDCCH search space being received to schedule a UL transmission (PUSCH, PUCCH, PRACH, SRS, etc.), the UE can transmit the channel acquisition signaling preceding the scheduled UL transmission. Optionally, an additional LCP mapping restriction can be added for each LCH/LCG. For example, if at least one LCH that allows channel acquisition signaling to be transmitted prior to the data transmission is multiplexed in the current MAC packet data unit (PDU), the UE can transmit the channel acquisition signaling prior to transmission of this MAC PDU.

According to another exemplary embodiment, the application/usage of channel acquisition signaling may rely on, for example, one or more of the following LCP mapping restrictions:
  priority where an increasing priority value indicates a lower priority level;
  allowedSCS-List which sets the allowed subcarrier spacing(s) for transmission;
  maxPUSCH-Duration which sets the maximum PUSCH duration allowed for transmission;
  configuredGrantType1Allowed which sets whether a configured grant Type 1 can be used for transmission; and
  allowedServingCells which sets the allowed cell(s) for transmission.

Optionally, the configuration information about the channel acquisition function received from the gNB can indicate the application/usage of channel acquisition signaling at the UE. In one example, for a PUSCH transmission, if its associated maxPUSCH-Duration is less than a configured threshold, a channel acquisition indicator can be transmitted by the UE prior to the data transmission. In another example, for a PUSCH transmission, if its associated allowedSCS maps to the configured SCS (e.g., equal or higher than the configured SCS), a channel acquisition indicator can be transmitted by the UE prior to the data transmission. In yet another example, for a PUSCH transmission, if its associated serving cell is configured to allow the transmission of channel acquisition signaling, a channel acquisition indicator can be transmitted by the UE prior to the data transmission. In a further example, for a PUSCH transmission, if at least one LCH associated with the configured priority is mapped to the transmission, a channel acquisition indicator can be transmitted by the UE prior to the data transmission.

According to the exemplary method 200 illustrated in FIG. 2, the first communication device can perform traffic transmission for the service between the first communication device and the second communication device, based at least in part on the determination, as shown in block 204. The determination of enabling or disabling the channel acquisition function of the first communication device for the service may result in different configurations of the traffic transmission for the service.

In accordance with some exemplary embodiments, in response to the determination of enabling the channel acquisition function of the first communication device for the service, the operation of performing the traffic transmission for the service between the first communication device and the second communication device may comprise: allowing the first communication device to acquire the channel for communications between the first communication device and the second communication device, and allowing the first communication device to transmit channel acquisition signaling in the channel acquired by the first communication device.

In accordance with some exemplary embodiments, the first communication device may be allowed to acquire the channel for up to a predefined number of times, during occupation time of the channel sharable by the first communication device and the second communication device. As an example, for a configured service, there may be a maximum number of switch occurrences between a UL/DL burst and a DL/UL burst within a shared COT duration. In this way, for a delay sensitive service, a small number of switch occurrences may be configured for latency reduction purpose, while a large number of switch occurrences may be configured for a delay non-sensitive service.

In accordance with some exemplary embodiments, the channel acquisition function may be configured per radio resource unit allocated to the first communication device. The radio resource unit may comprise at least one of a bandwidth part (BWP), a channel, a serving cell and a carrier. For example, in the case that a UE is configured with wideband operation across multiple active BWPs or multiple channels, or multiple serving cells/carriers, the configuration on the application of channel acquisition signaling or COT sharing may be set per BWP/channel/serving cell/carrier.

In accordance with some exemplary embodiments, the first communication device can perform the traffic transmission for the service between the first communication device and the second communication device by transmitting the channel acquisition signaling in the channel acquired by the first communication device. In this case, for the first communication device, gap duration between reception of traffics from the second communication device and transmission of traffics to the second communication device may be smaller than a predefined threshold. Optionally, whether to apply or not to apply channel acquisition signaling can be determined based at last in part on the gap between reception of the PDCCH and transmission of the corresponding PUSCH transmission. If the gap (e.g., the value of K2) is smaller than a predefined threshold, the channel acquisition signaling/indicator can be transmitted.

In accordance with some exemplary embodiments, the channel acquisition signaling may be pre-prepared and encoded to be transmitted in at least one of: a packet data unit (such as MAC PDU, etc.), control signaling (such as PUCCH, etc.), random access signaling (such as PRACH, etc.), a reference signal (such as SRS, CSI-RS, etc.), and a paging message (such as an empty paging message). Optionally, for the packet data unit carrying the channel acquisition signaling, an automatic repeat request (such as HARQ) process may be applied based at least in part on another automatic repeat request process of subsequent transmission from the first communication device to the second communication device.

According to an exemplary embodiment, the channel acquisition signaling/indicator can be a preceding PUSCH transmission spanning a few consecutive OFDM symbols in the time domain, with predefined modulation and coding scheme (MCS), transport block size, transmission rank, and etc. Optionally, a UE can prepare a MAC PDU for the preceding transmission before a UL grant is decoded, so that the UE can perform the preceding transmission as soon as it decodes the received UL grant. For instance, the UE can prepare an encoded data block with one-slot duration on PUSCH per active channel. When a UL grant is received for a channel, if necessary, the preceding transmission can be performed with the pre-prepared encoded data for channel acquisition purpose.

According to an exemplary embodiment, the HARQ functionality with respect to the preceding transmission for channel acquisition purpose may be supported in various suitable ways. For example, the MAC PDU may share the same HARQ process with the scheduled PUSCH transmission. Alternatively, the HARQ process of the MAC PDU for the preceding transmission may be derived based at least in part on the HARQ process identifier (ID) of the scheduled PUSCH transmission according to a predefined rule. For instance, the HARQ process of the preceding transmission can be determined as "HARQ process ID of the scheduled PUSCH+maximum number of HARQ processes−1".

In accordance with some exemplary embodiments, the first communication device may be assigned with radio resources specified for the transmission of the channel acquisition signaling. As mentioned previously, the channel acquisition signaling/indicator can be performed as a preceding transmission. Optionally, the preceding transmission for channel acquisition purpose can be L1 control signaling, such as PUCCH (e.g., PUCCH-SR), an SRS transmission or a PRACH transmission (e.g., a PRACH preamble or MsgA in case of 2-step RA procedure being supported). In the embodiment, the control channel resources used for the channel acquisition signaling can be preconfigured for a UE, or dynamically signaled in the time domain, for example, in the DCI signaling which carries the data grant. The indicated resources especially in the time domain may give additional transmission opportunities compared to the ones that are already dedicatedly configured to the UE.

In accordance with some exemplary embodiments, the first communication device can perform power control for the transmission of the channel acquisition signaling. For example, a special power control may be applied for the preceding transmissions for channel acquisition purpose. In this case, a minimum transmission power threshold can be configured per channel to secure the channel acquisition signaling. On the other hand, a maximum transmission power threshold may be also configured to avoid a neighboring transmitter to be blocked due to transmission of the channel acquisition signaling.

In accordance with some exemplary embodiments, the channel acquisition signaling may comprise one or more message items. It can be appreciated that various message formats and/or contents may be applicable for the channel acquisition signaling to indicate the acquisition of the channel for the first communication device. As an example, the one or more message items may comprise at least one of: a measurement report of signal quality (such as a DL reference signal receiving power (RSRP) measurement report), a power headroom report (PHR), a buffer status report (BSR), an interference report, a channel state information (CSI) report, a candidate beam list, a measurement report of neighboring cells (such as intra-network neighboring cells, inter-network neighboring cells, or inter-RAT/-frequency neighboring cells), a measurement report of transmission points (such as intra-network transmission points, inter-network transmission points, or inter-RAT/frequency transmission points), and a control element predefined for the channel acquisition signaling (e.g., a MAC CE with only a MAC sub-header, with padding and without payload).

In accordance with some exemplary embodiments, the one or more message items may be packed as a control element for medium access control. For example, some message items may be packed as a MAC CE to avoid higher layer (such as service data adaptation protocol (SDAP)/packet data convergence protocol (PDCP)/radio link control (RLC) layer) processing delay. In this way, the user plane (UP) processing time for an LCP procedure and the UP processing time at PDCP or RLC layer can be saved.

In accordance with some exemplary embodiments, the one or more message items may be included in a packet data unit (PDU) according to a predefined order of priority levels of the one or more message items. As an example, a priority order may be predefined or configured for the one or more message items. The first communication device can include the one or more message items into a MAC PDU for the channel acquisition signaling according to a descending order of the priority levels.

In accordance with some exemplary embodiments, the channel acquisition signaling may comprise a copy of information content carried in subsequent transmission from the first communication device to the second communication device. In this case, the channel acquisition signaling, which can be implemented as the preceding transmission for channel acquisition purpose, may also serve data duplication purpose for information such as control signaling, RRC signaling or data transmission. As such, one copy of the information content may be included in the preceding transmission for channel acquisition purpose, another copy of the information content can be carried on subsequent data transmission (e.g., PUSCH transmission corresponding to the received UL grant) or other channels (such as PRACH or PUCCH).

In accordance with some exemplary embodiments, the first communication device can apply a diversity technique for the transmission of the channel acquisition signaling. According to an exemplary embodiment, it can be configured whether transmission beamforming is applied for the channel acquisition signaling. For example, it may be configured that the channel acquisition signaling can use omni-transmission. Alternatively, the reciprocity based beamforming may be applied for the channel acquisition signaling. Optionally, for the transmission of the channel acquisition signaling, the first communication device can apply the precoding vector which is used in the last transmission.

In accordance with some exemplary embodiments, the first communication device may transmit other channel acquisition signaling to the second communication device in the channel acquired by the first communication device, based at least in part on gap duration between reception of traffics from the second communication device and transmission of traffics to the second communication device. For example, the first communication device may be configured to perform more than one preceding transmissions for channel acquisition purpose depending on the gap duration. In this case, the first communication device can pre-prepare the respective MAC PDUs according to the configured transmission parameters (e.g., parameters for PUSCH transmission).

In accordance with some exemplary embodiments, the first communication device may receive from the second communication device a notification that the second communication device transmits channel acquisition signaling to assist the first communication device in acquiring the channel. In this case, the first communication device can use the channel acquired for the first communication device by the second communication device, without transmitting channel acquisition signaling. For example, in the case that there are possibilities to transmit channel acquisition signaling in either DL or UL prior to a transmission within a shared COT period, a gNB can configure or control on whether to transmit the channel acquisition signaling in DL or UL to fill the switch gap. If the gNB is going to transmit the channel acquisition signaling to fill the switch gap during the shared COT period, the gNB can signal the corresponding UE to disable the transmission of channel acquisition signaling in UL. Alternatively, in order to assist the UE in seizing the channel, one or more preconfigured UEs also can transmit channel acquisition signaling to fill the switch gap during the shared COT period.

It is noted that although some embodiments of the present disclosure are mainly described with respect to the channel acquisition in UL, the similar function configuration, message content and/or signaling transmission may be applicable for the DL channel acquisition purpose. For example, L1 control signaling, such as PDCCH (e.g., DCI), a demodulation reference signal (DRS) transmission, a CSI-RS transmission or even an empty paging message (which does not page any UE) can be applied in the DL channel acquisition.

Figure 3:
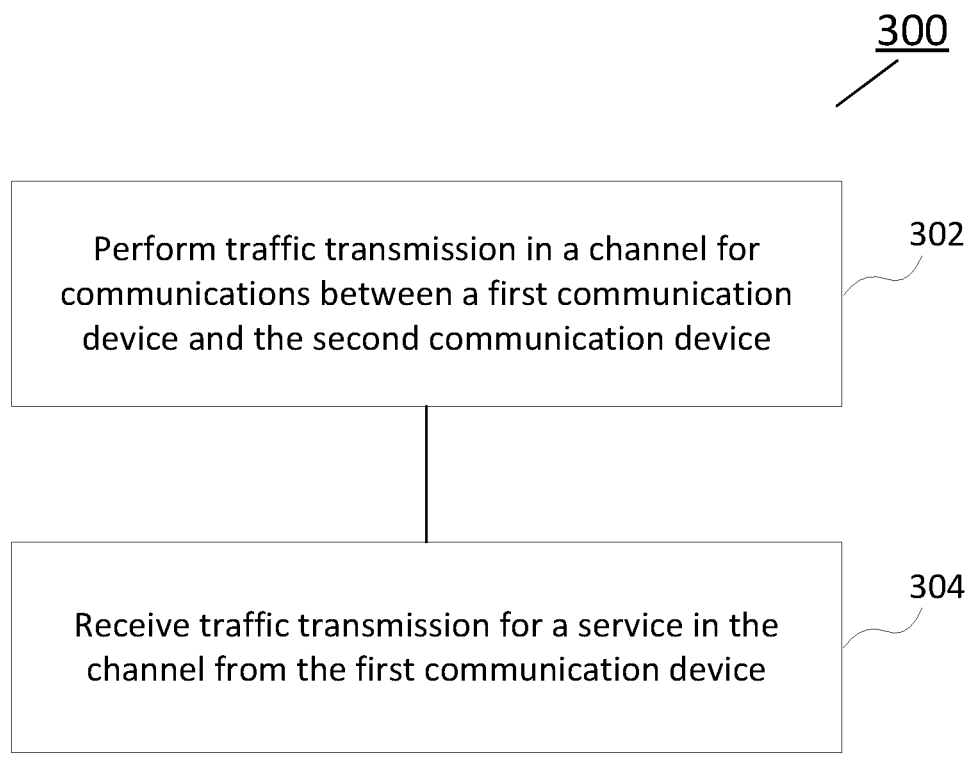
FIG. 3 is a flowchart illustrating another method according to some embodiments of the present disclosure e.

FIG. 3 is a flowchart illustrating another method 300 according to some embodiments of the present disclosure. The method 300 illustrated in FIG. 3 may be performed by a second communication device or an apparatus communicatively coupled to the second communication device. In accordance with an exemplary embodiment, the second communication device may be able to initiate COT which is sharable by a first communication device as described in connection with FIG. 2. In accordance with some exemplary embodiments, the first communication device may comprise one of a network node and a terminal device, and the second communication device may comprise the other of the network node and the terminal device.

According to the exemplary method 300 illustrated in FIG. 3, the second communication device can perform traffic transmission in a channel for communications between a first communication device and the second communication device, as shown in block 302. As described in connection with FIG. 2, the channel may be acquired by the first communication device which enables a channel acquisition function for a service according to one or more property parameters of the service. The second communication device can receive traffic transmission for the service in the channel from the first communication device, as shown in block 304.

In accordance with some exemplary embodiments, the one or more property parameters of the service may indicate a latency requirement of the service, a quality of service specific to the service, a priority level of the service, a purpose of the service, or any combination thereof. Optionally, according to the content of the service, the first communication device can determine whether to enable or disable the channel acquisition function for the service.

In accordance with some exemplary embodiments, the enablement of the channel acquisition function for the service may be based at least in part on configuration information about the channel acquisition function. For example, the configuration information may indicate the first communication device to enable the channel acquisition function for a service with a priority level higher than a first predefined level, and/or disable the channel acquisition function for a service with a priority level lower than a second predefined level. The first predefined level may be the same as or different from the second predefined level.

According to an exemplary embodiment where the first communication device comprises a terminal device and the second communication device comprises a network node, the second communication device may transmit the configuration information about the channel acquisition function to the first communication device, when performing the traffic transmission in the channel. For example, the configuration information may be carried in PDCCH implicitly or explicitly. Alternatively or additionally, the configuration information may use one or more LCP mapping restrictions and optionally one or more related parameters to indicate configuration or settings of the channel acquisition function. Optionally, the second communication device can assign some specified radio resources to the first communication device for the transmission of the channel acquisition signaling. The assignment of the radio resources can be dynamically adjusted by the second communication device.

In accordance with some exemplary embodiments, for the second communication device, the reception of the traffic transmission for the service in the channel from the first communication device may comprise receiving channel acquisition signaling from the first communication device to indicate that the channel is acquired by the first communication device. For example, the channel acquisition signaling may be received in at least one of a PDU, control signaling, random access signaling, a reference signal and a paging message. According to an exemplary embodiment, an automatic repeat request process may be used to implement the transmission of the channel acquisition signaling. Optionally, a diversity technique may be applied for the reception of the channel acquisition signaling.

In accordance with some exemplary embodiments, the channel acquisition signaling may comprise one or more message items, for example, including existing report messages or dedicated report messages transmitted from the first communication device to the second communication device. The one or more message items may be arranged according to a predefined rule (e.g., following a descending order of the priorities of the one or more message items). Alternatively or additionally, the channel acquisition signaling may comprise a copy of information content carried in subsequent transmission from the first communication device to the second communication device. In other words, the channel acquisition signaling may be implemented as redundant information of some important information content from the first communication device to the second communication device.

In accordance with some exemplary embodiments, the second communication device may receive other channel acquisition signaling in the channel acquired by the first communication device, in addition to the previously mentioned channel acquisition signaling. For example, the other channel acquisition signaling may be transmitted by the first communication device or another communication device which is able to assist the first communication device in acquiring the channel.

In accordance with some exemplary embodiments, the second communication device can transmit channel acquisition signaling to assist the first communication device in acquiring the channel. In this case, the second communication device can indicate or notify the first communication device not to transmit channel acquisition signaling in the channel which is acquired for the first communication device by the second communication device.

The proposed solution according to one or more exemplary embodiments can make a communication device such as gNB/UE enable or disable a channel acquisition function per service to seize a channel during a sharable COT duration. In the proposed solution, the communication device can transmit channel acquisition signaling or indicator to announce occupation of the channel by this communication device in case of enabling the channel acquisition function for a specific service (e.g., a delay sensitive service). Taking advantageous of the proposed solution can improve the latency performance and the multiplexing gain by avoiding LBT operations. On the other hand, the utilization of radio resources can be enhanced due to that the channel acquisition signaling configured for a specified service can carry other useful information (e.g., a measurement report, redundant data of some information content, etc.) in addition to indicating channel acquisition.

The various blocks shown in FIGS. 2-3 may be viewed as method steps, and/or as operations that result from operation of computer program code, and/or as a plurality of coupled logic circuit elements constructed to carry out the associated function(s). The schematic flow chart diagrams described above are generally set forth as logical flow chart diagrams. As such, the depicted order and labeled steps are indicative of specific embodiments of the presented methods. Other steps and methods may be conceived that are equivalent in function, logic, or effect to one or more steps, or portions thereof, of the illustrated methods. Additionally, the order in which a particular method occurs may or may not strictly adhere to the order of the corresponding steps shown.

Figure 4:
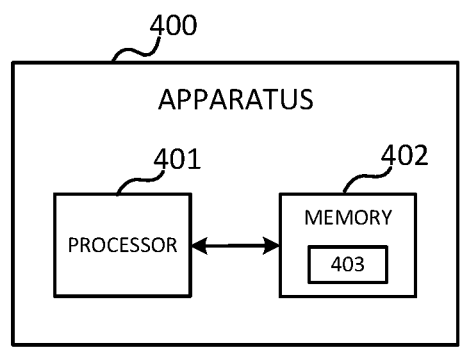
FIG. 4 is a block diagram illustrating an apparatus according to some embodiments of the present disclosure.

FIG. 4 is a block diagram illustrating an apparatus 400 according to various embodiments of the present disclosure. As shown in FIG. 4, the apparatus 400 may comprise one or more processors such as processor 401 and one or more memories such as memory 402 storing computer program codes 403. The memory 402 may be non-transitory machine/processor/computer readable storage medium. In accordance with some exemplary embodiments, the apparatus 400 may be implemented as an integrated circuit chip or module that can be plugged or installed into a first communication device as described with respect to FIG. 2, or a second communication device as described with respect to FIG. 3. In such case, the apparatus 400 may be implemented as a first communication device as described with respect to FIG. 2, or a second communication device as described with respect to FIG. 3.

In some implementations, the one or more memories 402 and the computer program codes 403 may be configured to, with the one or more processors 401, cause the apparatus 400 at least to perform any operation of the method as described in connection with FIG. 2. In other implementations, the one or more memories 402 and the computer program codes 403 may be configured to, with the one or more processors 401, cause the apparatus 400 at least to perform any operation of the method as described in connection with FIG. 3.

Alternatively or additionally, the one or more memories 402 and the computer program codes 403 may be configured to, with the one or more processors 401, cause the apparatus 400 at least to perform more or less operations to implement the proposed methods according to the exemplary embodiments of the present disclosure.

Figure 5:
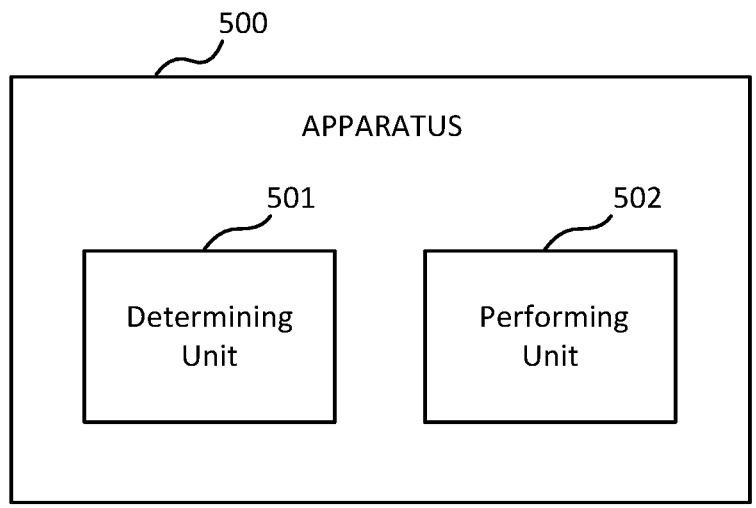
FIG. 5 is a block diagram illustrating another apparatus according to some embodiments of the present disclosure.

FIG. 5 is a block diagram illustrating an apparatus 500 according to some embodiments of the present disclosure. The apparatus 500 may be implemented as a first communication device or as a part of the first communication device. As shown in FIG. 5, the apparatus 500 may comprise a determining unit 501 and a performing unit 502. In an exemplary embodiment, the apparatus 500 may be implemented in a communication device such as UE/gNB which may be able to share COT initiated by another communication device such as gNB/UE. The determining unit 501 may be operable to carry out the operation in block 202, and the performing unit 502 may be operable to carry out the operation in block 204. Optionally, the determining unit 501 and/or the performing unit 502 may be operable to carry out more or less operations to implement the proposed methods according to the exemplary embodiments of the present disclosure.

Figure 6:
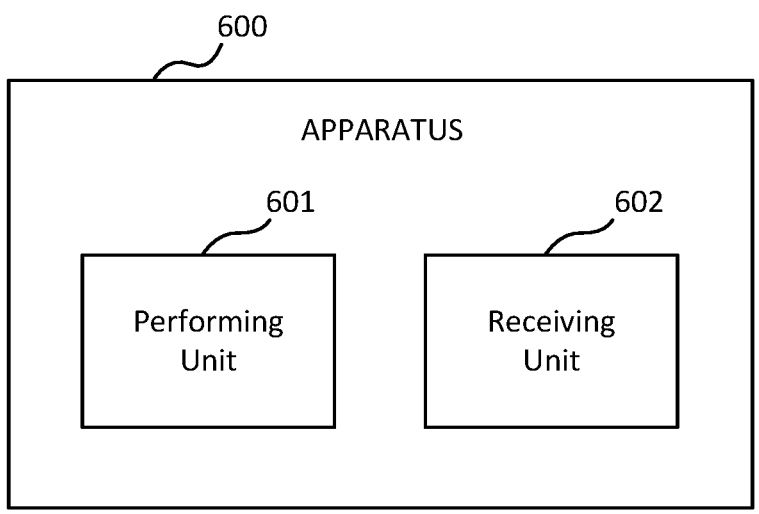
FIG. 6 is a block diagram illustrating yet another apparatus according to some embodiments of the present disclosure.

FIG. 6 is a block diagram illustrating an apparatus 600 according to some embodiments of the present disclosure. The apparatus 600 may be implemented as a second communication device or as a part of the second communication device. As shown in FIG. 6, the apparatus 600 may comprise a performing unit 601 and a receiving unit 602. In an exemplary embodiment, the apparatus 600 may be implemented in a communication device such as gNB/UE which is able to initiate COT sharable by another communication device such as UE/gNB. The performing unit 601 may be operable to carry out the operation in block 302, and the receiving unit 602 may be operable to carry out the operation in block 304. Optionally, the performing unit 601 and/or the receiving unit 602 may be operable to carry out more or less operations to implement the proposed methods according to the exemplary embodiments of the present disclosure.

Figure 7:
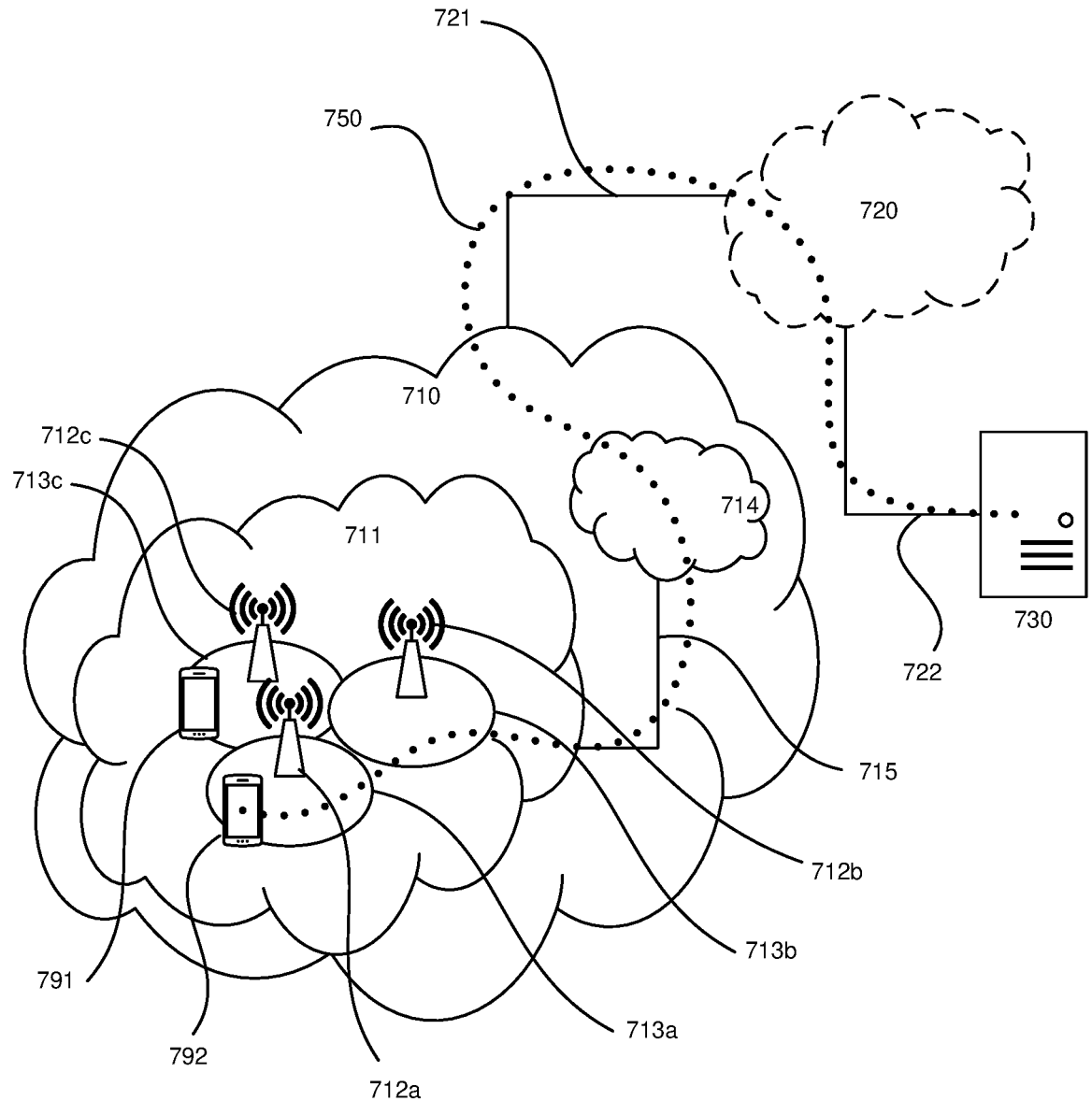
FIG. 7 is a block diagram illustrating a telecommunication network connected via an intermediate network to a host computer in accordance with some embodiments of the present disclosure.

FIG. 7 is a block diagram illustrating a telecommunication network connected via an intermediate network to a host computer in accordance with some embodiments of the present disclosure.

With reference to FIG. 7, in accordance with an embodiment, a communication system includes a telecommunication network 710, such as a 3GPP-type cellular network, which comprises an access network 711, such as a radio access network, and a core network 714. The access network 711 comprises a plurality of base stations 712a, 712b, 712c, such as NBs, eNBs, gNBs or other types of wireless access points, each defining a corresponding coverage area 713a, 713b, 713c. Each base station 712a, 712b, 712c is connectable to the core network 714 over a wired or wireless connection 715. A first UE 791 located in a coverage area 713c is configured to wirelessly connect to, or be paged by, the corresponding base station 712c. A second UE 792 in a coverage area 713a is wirelessly connectable to the corresponding base station 712a. While a plurality of UEs 791, 792 are illustrated in this example, the disclosed embodiments are equally applicable to a situation where a sole UE is in the coverage area or where a sole UE is connecting to the corresponding base station 712.

The telecommunication network 710 is itself connected to a host computer 730, which may be embodied in the hardware and/or software of a standalone server, a cloud-implemented server, a distributed server or as processing resources in a server farm. The host computer 730 may be under the ownership or control of a service provider, or may be operated by the service provider or on behalf of the service provider. Connections 721 and 722 between the telecommunication network 710 and the host computer 730 may extend directly from the core network 714 to the host computer 730 or may go via an optional intermediate network 720. An intermediate network 720 may be one of, or a combination of more than one of, a public, private or hosted network; the intermediate network 720, if any, may be a backbone network or the Internet; in particular, the intermediate network 720 may comprise two or more sub-networks (not shown).

The communication system of FIG. 7 as a whole enables connectivity between the connected UEs 791, 792 and the host computer 730. The connectivity may be described as an over-the-top (OTT) connection 750. The host computer 730 and the connected UEs 791, 792 are configured to communicate data and/or signaling via the OTT connection 750, using the access network 711, the core network 714, any intermediate network 720 and possible further infrastructure (not shown) as intermediaries. The OTT connection 750 may be transparent in the sense that the participating communication devices through which the OTT connection 750 passes are unaware of routing of uplink and downlink communications. For example, the base station 712 may not or need not be informed about the past routing of an incoming downlink communication with data originating from the host computer 730 to be forwarded (e.g., handed over) to a connected UE 791. Similarly, the base station 712 need not be aware of the future routing of an outgoing uplink communication originating from the UE 791 towards the host computer 730.

Figure 8:
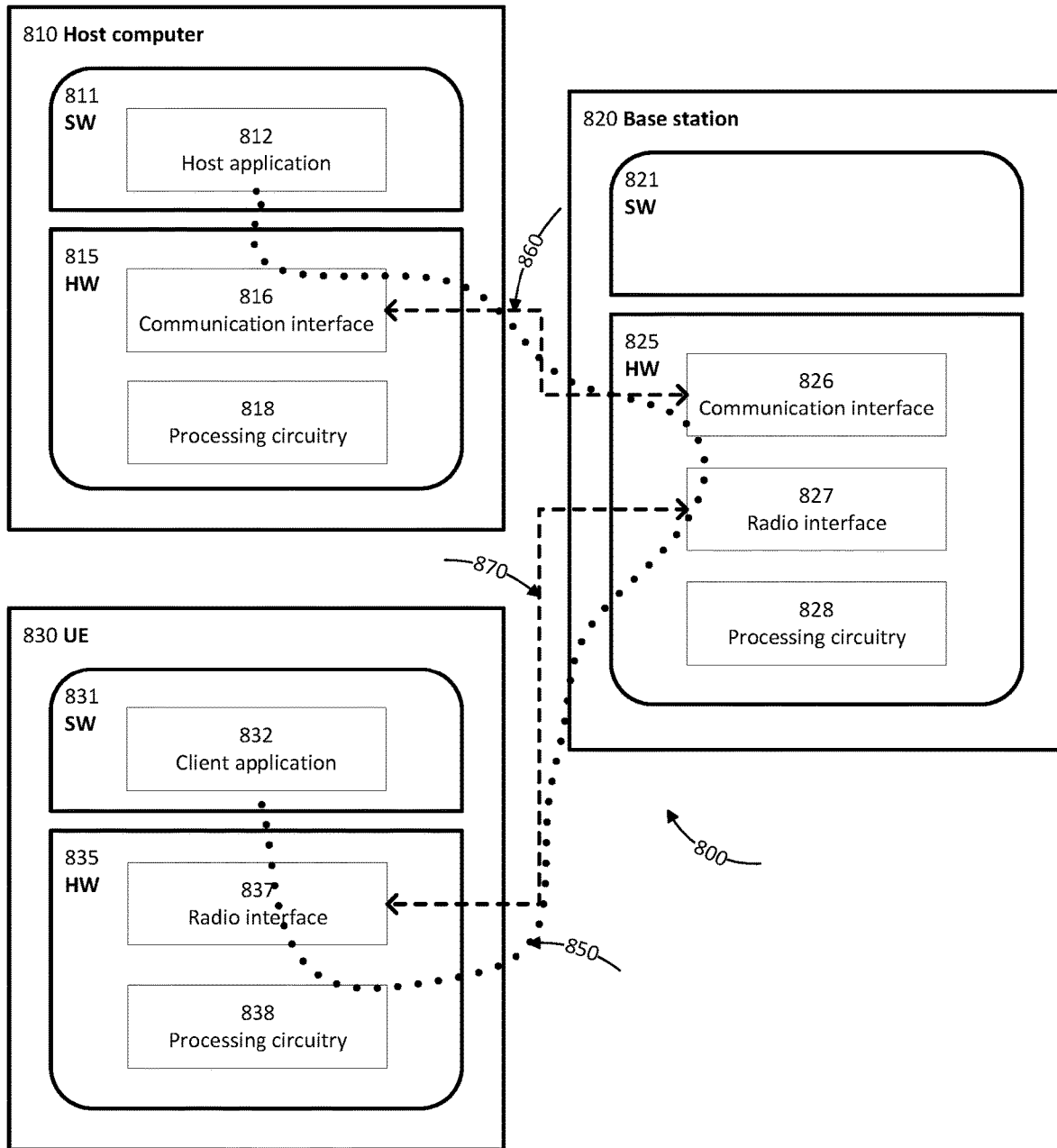
FIG. 8 is a block diagram illustrating a host computer communicating via a base station with a UE over a partially wireless connection in accordance with some embodiments of the present disclosure.

FIG. 8 is a block diagram illustrating a host computer communicating via a base station with a UE over a partially wireless connection in accordance with some embodiments of the present disclosure.

Example implementations, in accordance with an embodiment, of the UE, base station and host computer discussed in the preceding paragraphs will now be described with reference to FIG. 8. In a communication system 800, a host computer 810 comprises hardware 815 including a communication interface 816 configured to set up and maintain a wired or wireless connection with an interface of a different communication device of the communication system 800. The host computer 810 further comprises a processing circuitry 818, which may have storage and/or processing capabilities. In particular, the processing circuitry 818 may comprise one or more programmable processors, application-specific integrated circuits, field programmable gate arrays or combinations of these (not shown) adapted to execute instructions. The host computer 810 further comprises software 811, which is stored in or accessible by the host computer 810 and executable by the processing circuitry 818. The software 811 includes a host application 812. The host application 812 may be operable to provide a service to a remote user, such as UE 830 connecting via an OTT connection 850 terminating at the UE 830 and the host computer 810. In providing the service to the remote user, the host application 812 may provide user data which is transmitted using the OTT connection 850.

The communication system 800 further includes a base station 820 provided in a telecommunication system and comprising hardware 825 enabling it to communicate with the host computer 810 and with the UE 830. The hardware 825 may include a communication interface 826 for setting up and maintaining a wired or wireless connection with an interface of a different communication device of the communication system 800, as well as a radio interface 827 for setting up and maintaining at least a wireless connection 870 with the UE 830 located in a coverage area (not shown in FIG. 8) served by the base station 820. The communication interface 826 may be configured to facilitate a connection 860 to the host computer 810. The connection 860 may be direct or it may pass through a core network (not shown in FIG. 8) of the telecommunication system and/or through one or more intermediate networks outside the telecommunication system. In the embodiment shown, the hardware 825 of the base station 820 further includes a processing circuitry 828, which may comprise one or more programmable processors, application-specific integrated circuits, field programmable gate arrays or combinations of these (not shown) adapted to execute instructions. The base station 820 further has software 821 stored internally or accessible via an external connection.

The communication system 800 further includes the UE 830 already referred to. Its hardware 835 may include a radio interface 837 configured to set up and maintain a wireless connection 870 with a base station serving a coverage area in which the UE 830 is currently located. The hardware 835 of the UE 830 further includes a processing circuitry 838, which may comprise one or more programmable processors, application-specific integrated circuits, field programmable gate arrays or combinations of these (not shown) adapted to execute instructions. The UE 830 further comprises software 831, which is stored in or accessible by the UE 830 and executable by the processing circuitry 838. The software 831 includes a client application 832. The client application 832 may be operable to provide a service to a human or non-human user via the UE 830, with the support of the host computer 810. In the host computer 810, an executing host application 812 may communicate with the executing client application 832 via the OTT connection 850 terminating at the UE 830 and the host computer 810. In providing the service to the user, the client application 832 may receive request data from the host application 812 and provide user data in response to the request data. The OTT connection 850 may transfer both the request data and the user data. The client application 832 may interact with the user to generate the user data that it provides.

It is noted that the host computer 810, the base station 820 and the UE 830 illustrated in FIG. 8 may be similar or identical to the host computer 730, one of base stations 712a, 712b, 712c and one of UEs 791, 792 of FIG. 7, respectively. This is to say, the inner workings of these entities may be as shown in FIG. 8 and independently, the surrounding network topology may be that of FIG. 7.

In FIG. 8, the OTT connection 850 has been drawn abstractly to illustrate the communication between the host computer 810 and the UE 830 via the base station 820, without explicit reference to any intermediary devices and the precise routing of messages via these devices. Network infrastructure may determine the routing, which it may be configured to hide from the UE 830 or from the service provider operating the host computer 810, or both. While the OTT connection 850 is active, the network infrastructure may further take decisions by which it dynamically changes the routing (e.g., on the basis of load balancing consideration or reconfiguration of the network).

Wireless connection 870 between the UE 830 and the base station 820 is in accordance with the teachings of the embodiments described throughout this disclosure. One or more of the various embodiments improve the performance of OTT services provided to the UE 830 using the OTT connection 850, in which the wireless connection 870 forms the last segment. More precisely, the teachings of these embodiments may improve the latency and the power consumption, and thereby provide benefits such as lower complexity, reduced time required to access a cell, better responsiveness, extended battery lifetime, etc.

A measurement procedure may be provided for the purpose of monitoring data rate, latency and other factors on which the one or more embodiments improve. There may further be an optional network functionality for reconfiguring the OTT connection 850 between the host computer 810 and the UE 830, in response to variations in the measurement results. The measurement procedure and/or the network functionality for reconfiguring the OTT connection 850 may be implemented in software 811 and hardware 815 of the host computer 810 or in software 831 and hardware 835 of the UE 830, or both. In embodiments, sensors (not shown) may be deployed in or in association with communication devices through which the OTT connection 850 passes; the sensors may participate in the measurement procedure by supplying values of the monitored quantities exemplified above, or supplying values of other physical quantities from which the software 811, 831 may compute or estimate the monitored quantities. The reconfiguring of the OTT connection 850 may include message format, retransmission settings, preferred routing etc.; the reconfiguring need not affect the base station 820, and it may be unknown or imperceptible to the base station 820. Such procedures and functionalities may be known and practiced in the art. In certain embodiments, measurements may involve proprietary UE signaling facilitating the host computer 810's measurements of throughput, propagation times, latency and the like. The measurements may be implemented in that the software 811 and 831 causes messages to be transmitted, in particular empty or 'dummy' messages, using the OTT connection 850 while it monitors propagation times, errors etc.

Figure 9:
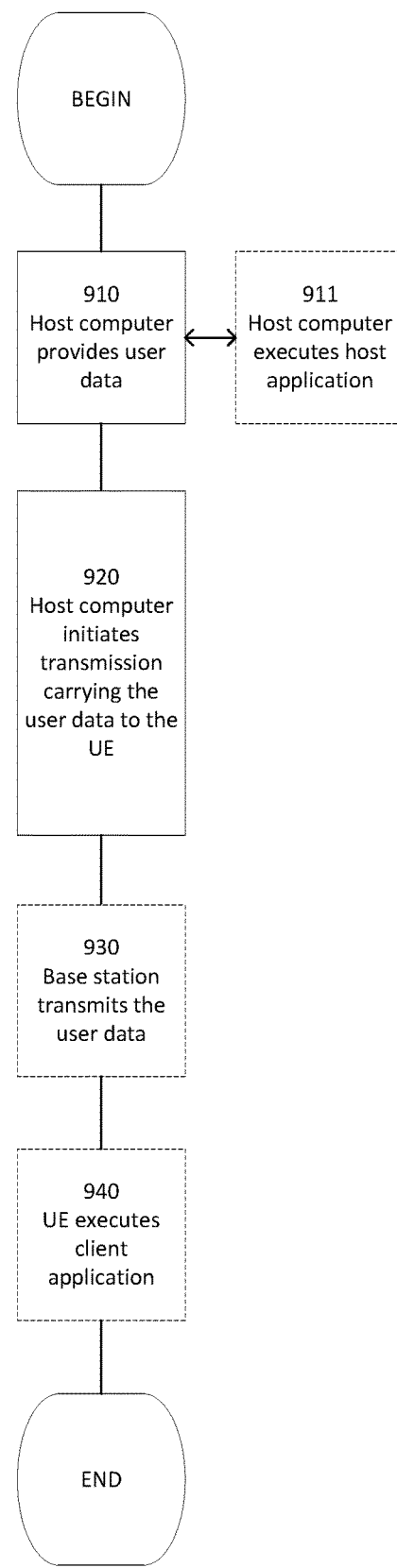
FIG. 9 is a flowchart illustrating a method implemented in a communication system, in accordance with an embodiment of the present disclosure.

FIG. 9 is a flowchart illustrating a method implemented in a communication system, in accordance with an embodiment. The communication system includes a host computer, a base station and a UE which may be those described with reference to FIG. 7 and FIG. 8. For simplicity of the present disclosure, only drawing references to FIG. 9 will be included in this section. In step 910, the host computer provides user data. In substep 911 (which may be optional) of step 910, the host computer provides the user data by executing a host application. In step 920, the host computer initiates a transmission carrying the user data to the UE. In step 930 (which may be optional), the base station transmits to the UE the user data which was carried in the transmission that the host computer initiated, in accordance with the teachings of the embodiments described throughout this disclosure. In step 940 (which may also be optional), the UE executes a client application associated with the host application executed by the host computer.

Figure 10:
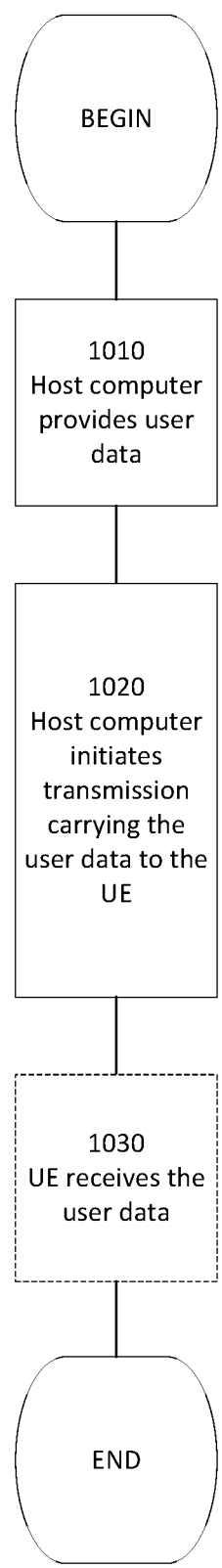
FIG. 10 is a flowchart illustrating a method implemented in a communication system, in accordance with an embodiment of the present disclosure.

FIG. 10 is a flowchart illustrating a method implemented in a communication system, in accordance with an embodiment. The communication system includes a host computer, a base station and a UE which may be those described with reference to FIG. 7 and FIG. 8. For simplicity of the present disclosure, only drawing references to FIG. 10 will be included in this section. In step 1010 of the method, the host computer provides user data. In an optional substep (not shown) the host computer provides the user data by executing a host application. In step 1020, the host computer initiates a transmission carrying the user data to the UE. The transmission may pass via the base station, in accordance with the teachings of the embodiments described throughout this disclosure. In step 1030 (which may be optional), the UE receives the user data carried in the transmission.

Figure 11:
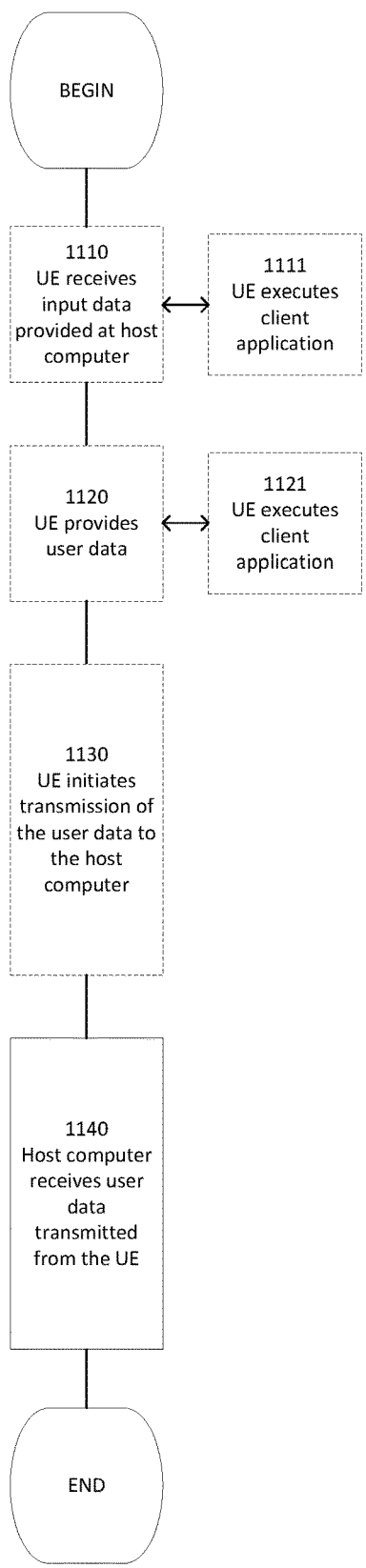
FIG. 11 is a flowchart illustrating a method implemented in a communication system, in accordance with an embodiment of the present disclosure.

FIG. 11 is a flowchart illustrating a method implemented in a communication system, in accordance with an embodiment. The communication system includes a host computer, a base station and a UE which may be those described with reference to FIG. 7 and FIG. 8. For simplicity of the present disclosure, only drawing references to FIG. 11 will be included in this section. In step 1110 (which may be optional), the UE receives input data provided by the host computer. Additionally or alternatively, in step 1120, the UE provides user data. In substep 1121 (which may be optional) of step 1120, the UE provides the user data by executing a client application. In substep 1111 (which may be optional) of step 1110, the UE executes a client application which provides the user data in reaction to the received input data provided by the host computer. In providing the user data, the executed client application may further consider user input received from the user. Regardless of the specific manner in which the user data was provided, the UE initiates, in substep 1130 (which may be optional), transmission of the user data to the host computer. In step 1140 of the method, the host computer receives the user data transmitted from the UE, in accordance with the teachings of the embodiments described throughout this disclosure.

Figure 12:
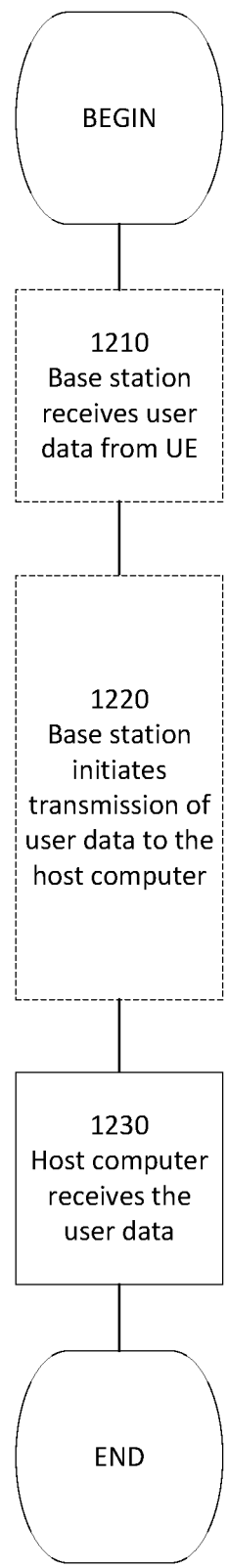
FIG. 12 is a flowchart illustrating a method implemented in a communication system, in accordance with an embodiment of the present disclosure.

FIG. 12 is a flowchart illustrating a method implemented in a communication system, in accordance with an embodiment. The communication system includes a host computer, a base station and a UE which may be those described with reference to FIG. 7 and FIG. 8. For simplicity of the present disclosure, only drawing references to FIG. 12 will be included in this section. In step 1210 (which may be optional), in accordance with the teachings of the embodiments described throughout this disclosure, the base station receives user data from the UE. In step 1220 (which may be optional), the base station initiates transmission of the received user data to the host computer. In step 1230 (which may be optional), the host computer receives the user data carried in the transmission initiated by the base station.

In general, the various exemplary embodiments may be implemented in hardware or special purpose chips, circuits, software, logic or any combination thereof. For example, some aspects may be implemented in hardware, while other aspects may be implemented in firmware or software which may be executed by a controller, microprocessor or other computing device, although the disclosure is not limited thereto. While various aspects of the exemplary embodiments of this disclosure may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the disclosure may be practiced in various components such as integrated circuit chips and modules. It should thus be appreciated that the exemplary embodiments of this disclosure may be realized in an apparatus that is embodied as an integrated circuit, where the integrated circuit may comprise circuitry (as well as possibly firmware) for embodying at least one or more of a data processor, a digital signal processor, baseband circuitry and radio frequency circuitry that are configurable so as to operate in accordance with the exemplary embodiments of this disclosure.

It should be appreciated that at least some aspects of the exemplary embodiments of the disclosure may be embodied in computer-executable instructions, such as in one or more program modules, executed by one or more computers or other devices. Generally, program modules include routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, random access memory (RAM), etc. As will be appreciated by one of skill in the art, the function of the program modules may be combined or distributed as desired in various embodiments. In addition, the function may be embodied in whole or partly in firmware or hardware equivalents such as integrated circuits, field programmable gate arrays (FPGA), and the like.

The present disclosure includes any novel feature or combination of features disclosed herein either explicitly or any generalization thereof. Various modifications and adaptations to the foregoing exemplary embodiments of this disclosure may become apparent to those skilled in the relevant arts in view of the foregoing description, when read in conjunction with the accompanying drawings. However, any and all modifications will still fall within the scope of the non-limiting and exemplary embodiments of this disclosure.

What is claimed is:

1. A method performed by a first communication device, comprising:
    determining, according to one or more property parameters of a service, whether to enable a channel acquisition function of the first communication device for the service, the channel acquisition function allowing the first communication device to acquire a channel for communications between the first communication device and a second communication device, the one or more property parameters of the service comprising at least one of:
        a latency requirement of the service;
        a quality of service related indicator specific to the service; and
        a purpose of the service; and
    performing traffic transmission for the service between the first communication device and the second communication device, based at least in part on the determination, performing the traffic transmission for the service between the first communication device and the second communication device comprising:
        allowing the first communication device to acquire the channel for communications between the first communication device and the second communication device, in response to the determination of enabling the channel acquisition function of the first communication device for the service;
        allowing the first communication device to transmit channel acquisition signaling in the channel acquired by the first communication device, the channel acquisition signaling comprising a copy of information content carried in subsequent transmission from the first communication device to the second communication device; and
        transmitting the channel acquisition signaling in the channel acquired by the first communication device.

2. The method according to claim 1, wherein the one or more property parameters of the service comprises:
    a priority level of the service.

3. The method according to claim 1, wherein the determination of whether to enable the channel acquisition function of the first communication device for the service is made by the first communication device based at least in part on configuration information about the channel acquisition function.

4. The method according to claim 3, wherein the configuration information indicates the first communication device to enable the channel acquisition function for a service with a priority level higher than a predefined level.

5. The method according to claim 1, wherein the first communication device is allowed to acquire the channel for up to a predefined number of times, during occupation time of the channel sharable by the first communication device and the second communication device.

6. The method according to claim 1, wherein the channel acquisition function is configured per radio resource unit allocated to the first communication device, and wherein the radio resource unit comprises at least one of a bandwidth part, a channel, a serving cell and a carrier.

7. The method according to claim 1, further comprising:
    applying a diversity technique for the transmission of the channel acquisition signaling.

8. The method according to claim 1, wherein for the first communication device, gap duration between reception of traffics from the second communication device and transmission of traffics to the second communication device is smaller than a predefined threshold.

9. The method according to claim 1, wherein the channel acquisition signaling is pre-prepared and encoded to be transmitted in at least one of:
    a packet data unit;
    control signaling;
    random access signaling;
    a reference signal; and
    a paging message.

10. The method according to claim 1, further comprising:
    performing power control for the transmission of the channel acquisition signaling.

11. The method according to claim 1, wherein the channel acquisition signaling comprises one or more message items comprising at least one of:
    a measurement report of signal quality;
    a power headroom report;
    a buffer status report;
    an interference report;
    a channel state information report;
    a candidate beam list;
    a measurement report of neighboring cells;
    a measurement report of transmission points; and
    a control element predefined for the channel acquisition signaling.

12. The method according to claim 11, wherein the one or more message items are packed as a control element for medium access control.

13. The method according to claim 11, wherein the one or more message items are included in a packet data unit according to a predefined order of priority levels of the one or more message items.

14. The method according to claim 1, wherein the first communication device is assigned with radio resources specified for the transmission of the channel acquisition signaling.

15. A method performed by a first communication device, the method comprising:
    determining, according to one or more property parameters of a service, whether to enable a channel acquisition function of the first communication device for the service, the channel acquisition function allowing the first communication device to acquire a channel for communications between the first communication device and a second communication device, the one or more property parameters of the service comprising at least one of:
        a latency requirement of the service;
        a quality of service related indicator specific to the service; and
        a purpose of the service; and performing traffic transmission for the service between the first communication device and the second communication device, based at least in part on the determination, performing the traffic transmission for the service between the first communication device and the second communication device comprising:
  allowing the first communication device to acquire the channel for communications between the first communication device and the second communication device, in response to the determination of enabling the channel acquisition function of the first communication device for the service; and
  allowing the first communication device to transmit channel acquisition signaling in the channel acquired by the first communication device;
the channel acquisition signaling being pre-prepared and encoded to be transmitted in a packet data unit in at least one of a packet data unit, control signaling, random access signaling a reference signal and a paging method, and for the packet data unit carrying the channel acquisition signaling, an automatic repeat request process being applied based at least in part on another automatic repeat request process of subsequent transmission from the first communication device to the second communication device; and
transmitting the channel acquisition signaling in the channel acquired by the first communication device.

16. A first communication device, comprising:
one or more processors; and
one or more memories comprising computer program codes,
the one or more memories and the computer program codes configured to, with the one or more processors, cause the first communication device at least to:
  determine, according to one or more property parameters of a service, whether to enable a channel acquisition function of the first communication device for the service, the channel acquisition function allowing the first communication device to acquire a channel for communications between the first communication device and a second communication device, the one or more property parameters of the service comprising at least one of:
    a latency requirement of the service;
    a quality of service related indicator specific to the service; and
    a purpose of the service; and
  perform traffic transmission for the service between the first communication device and the second communication device, based at least in part on the determination, performing the traffic transmission for the service between the first communication device and the second communication device comprising:
    allowing the first communication device to acquire the channel for communications between the first communication device and the second communication device, in response to the determination of enabling the channel acquisition function of the first communication device for the service;
    allowing the first communication device to transmit channel acquisition signaling in the channel acquired by the first communication device, the channel acquisition signaling comprising a copy of information content carried in subsequent transmission from the first communication device to the second communication device; and
    transmitting the channel acquisition signaling in the channel acquired by the first communication device.

* * * * *